Nov. 10, 1959 C. B. CROSS ET AL 2,912,092
ARTICLE FEEDING MEANS
Filed Aug. 19, 1957 6 Sheets-Sheet 1

INVENTORS
Cedric B. Cross
Carl E. Melhorn
BY Chapin & Neal
ATTORNEYS

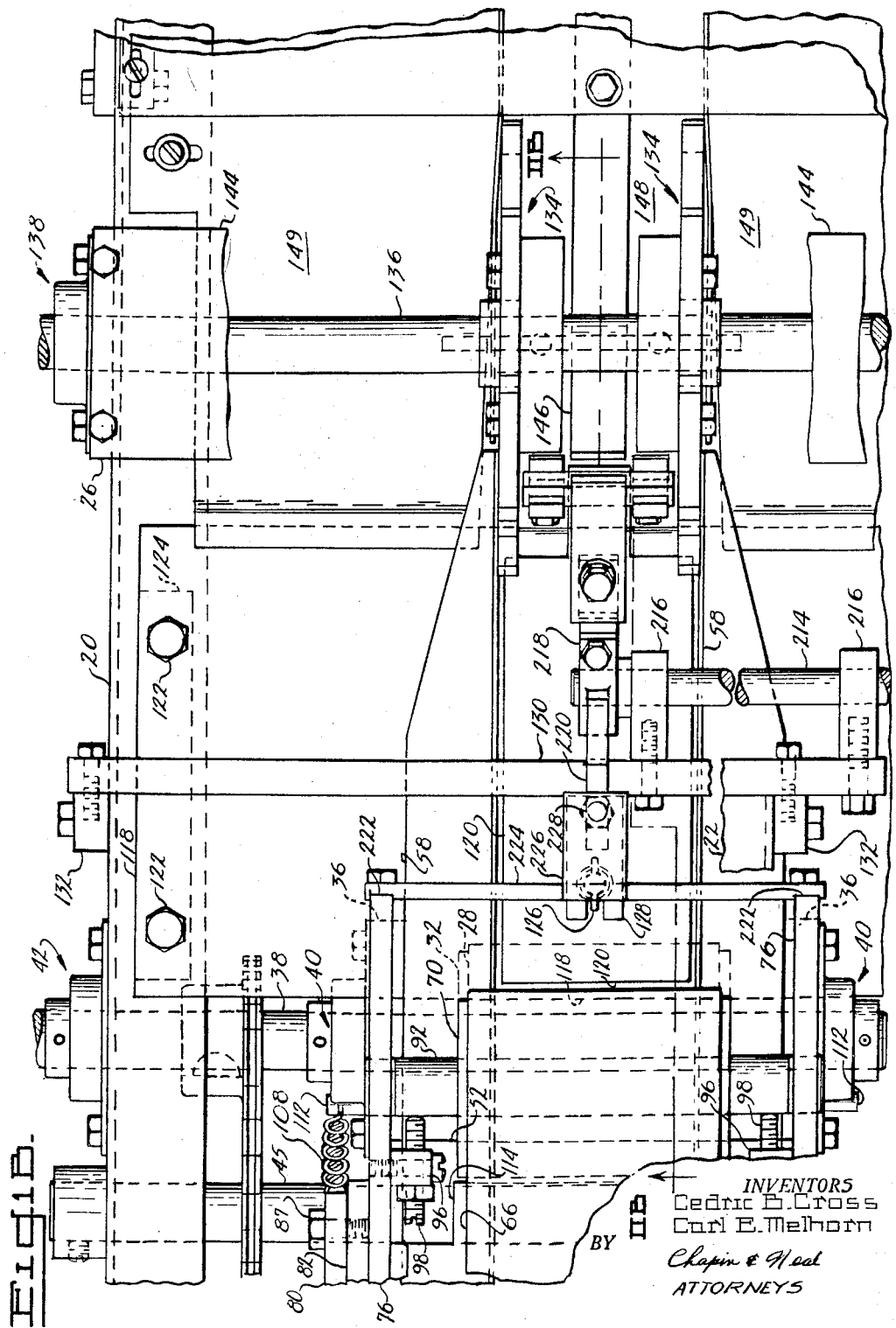

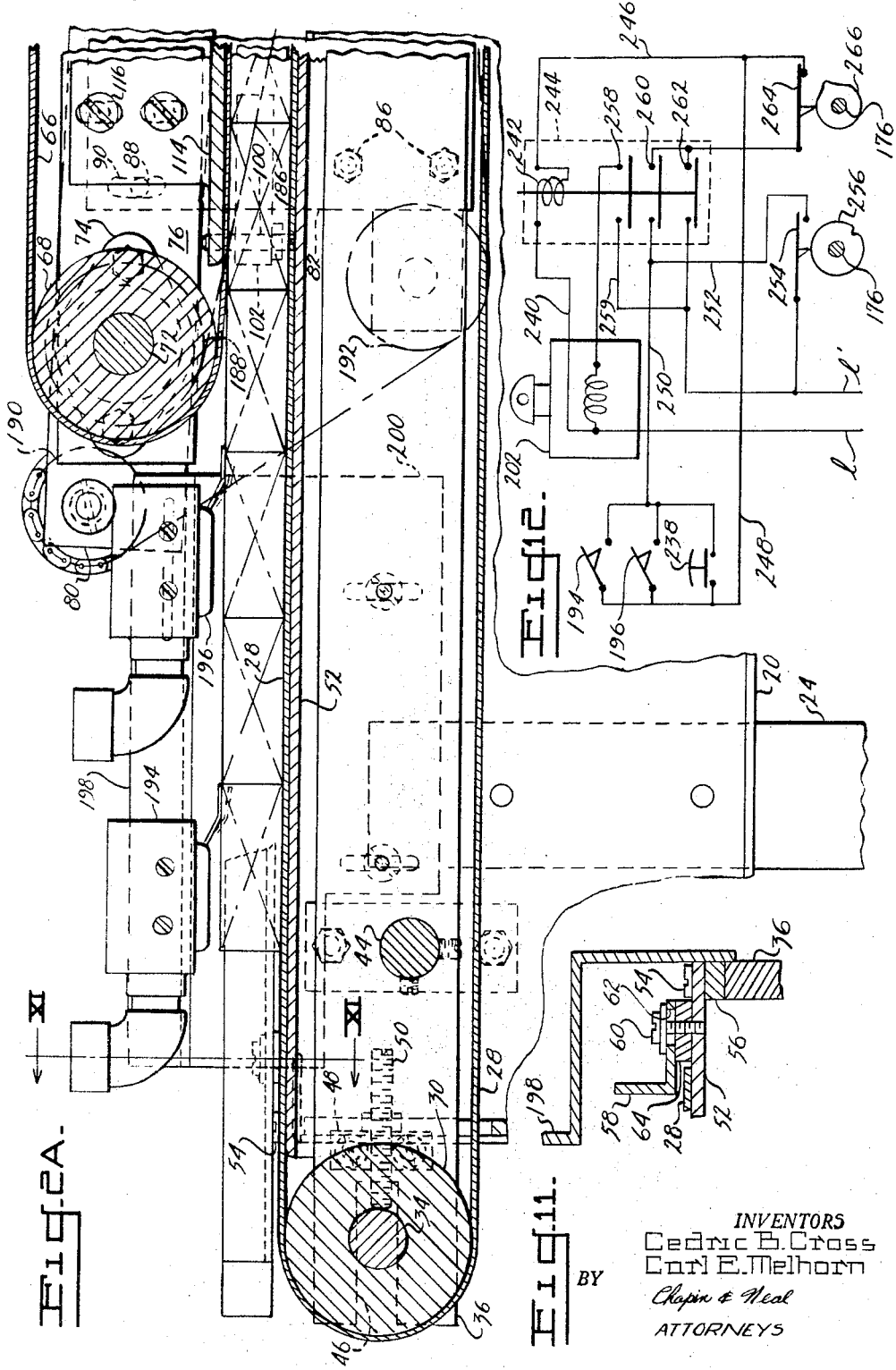

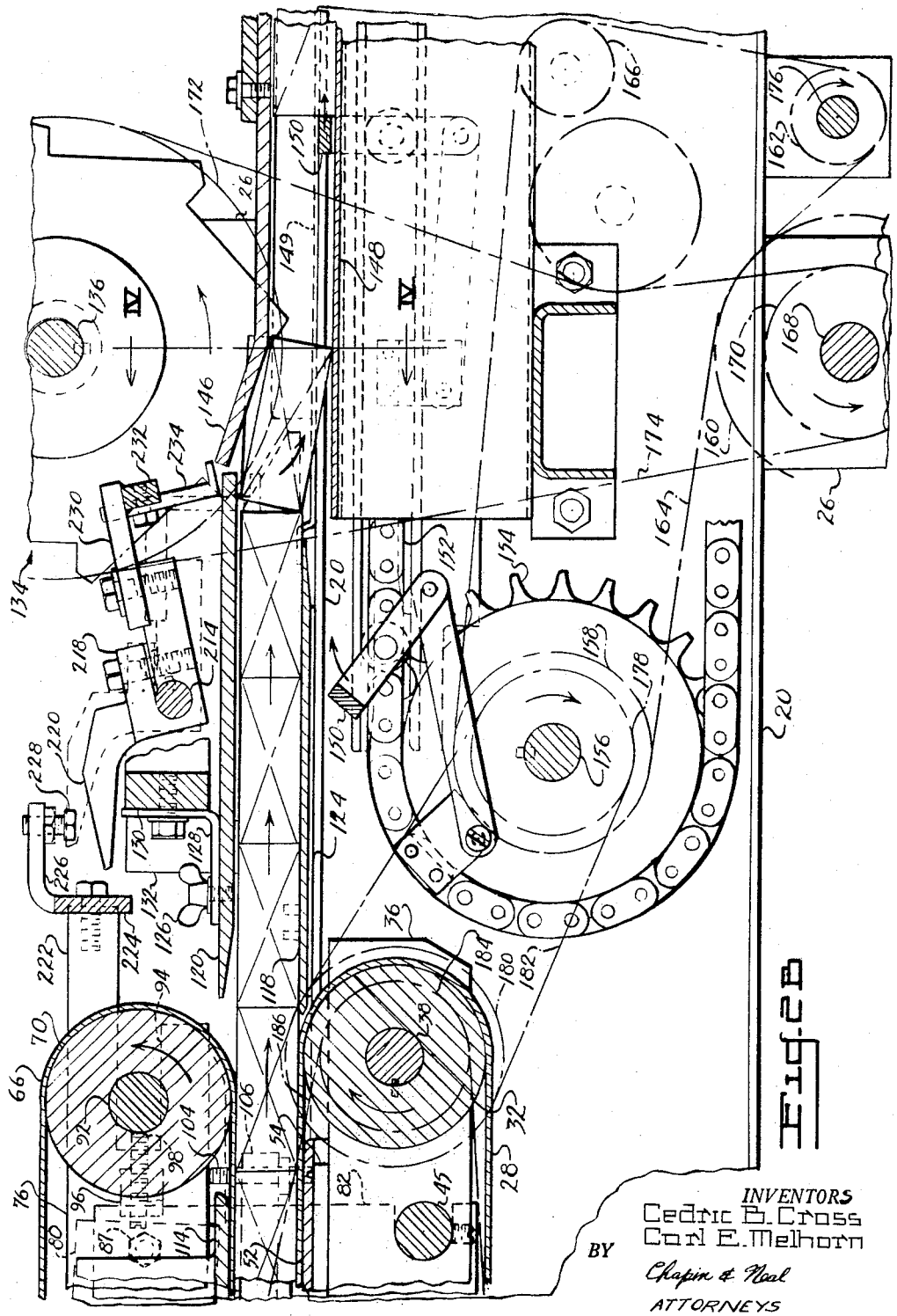

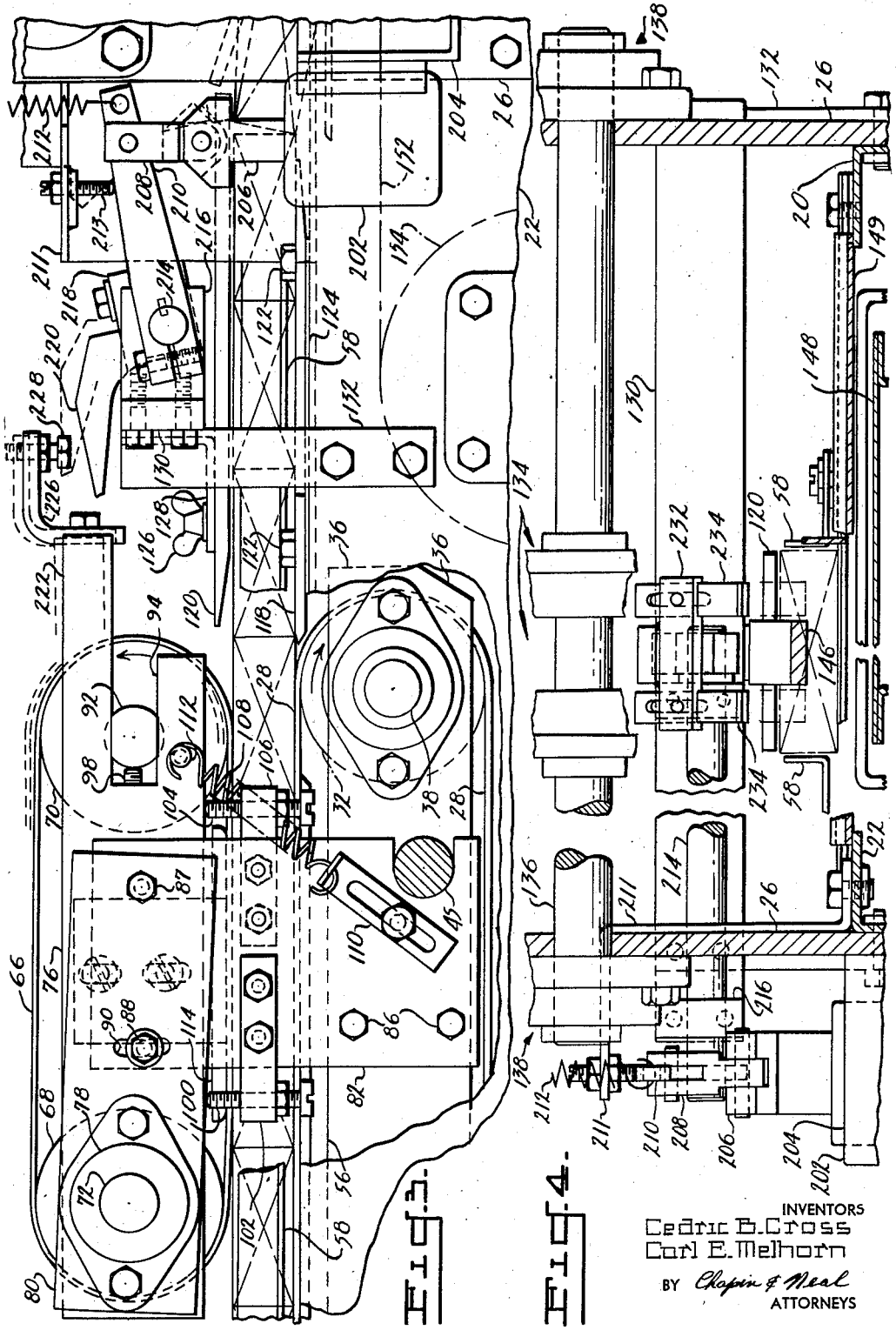

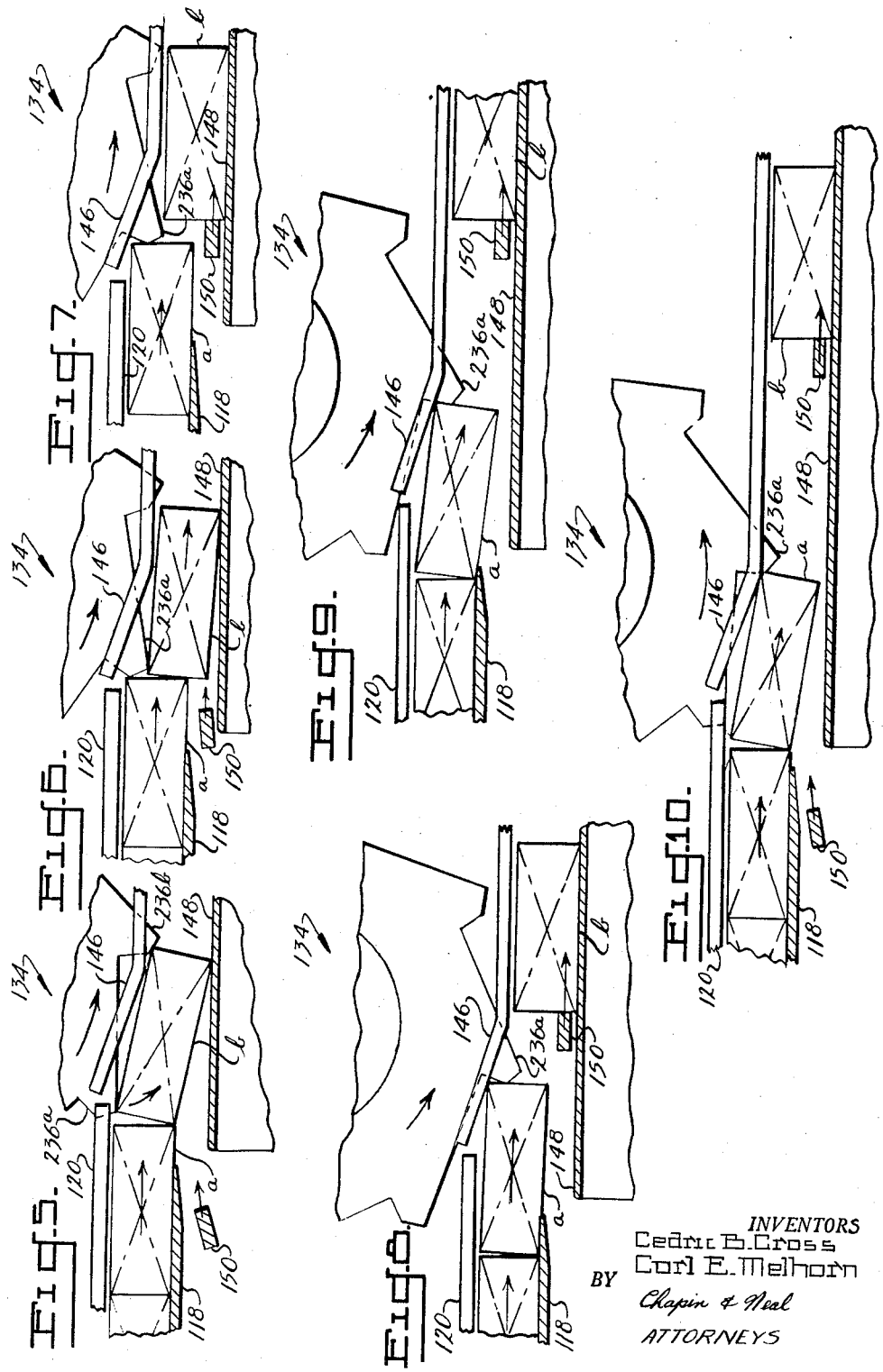

United States Patent Office 2,912,092
Patented Nov. 10, 1959

2,912,092
ARTICLE FEEDING MEANS

Cedric B. Cross, Monson, and Carl E. Melhorn, Springfield, Mass., assignors to Package Machinery Company, East Longmeadow, Mass., a corporation of Massachusetts Application August 19, 1957, Serial No. 679,034

11 Claims. (Cl. 198—23)

The present invention relates to the feeding of articles in spaced apart relation as to a work treating machine.

Certain wrapping machines, as those following the disclosure found in Serial No. 647,769, filed March 27, 1957, in the name of Cedric B. Cross, are capable of such high rates of feed that conventional feeding means are incapable of effectively and efficiently matching these high rates of operation. Whereas conventional wrapping machines may wrap at 60 or 80 articles a minute, these new machines are capable of operating at rates upwards of 400 per minute. The object of the invention is to feed articles in spaced apart relation to machines having extremely high rates of operation. Another object of the invention is to accomplish the above end by separating successive articles from a line of abutting articles without using any reciprocatory or oscillating members.

While the problem of feeding articles to wrapping machines has been referred to, it is to be understood that the feeding means of the present invention have general utility and could be employed to feed articles to most any type of work treating machine wherein it is desired that the articles be spaced apart.

The invention is characterized by means for feeding a line of abutting articles against a constantly rotating feed wheel which controls the rate of advance of the line of articles. The feed wheel has projections which release successive articles to conveyor means moving faster than the rate at which the line of articles is advancing, thus spacing the articles apart along the conveyor.

The above and other related objects and features of the invention will be apparent from a reading of the following detailed description of the disclosure found in the accompanying drawings and the particular novelty thereof pointed out in the appended claims.

In the drawings,

Figs. 1A and 1B provide a composite plan view of the improved feeding means with certain portions being broken away;

Figs. 2A and 2B provide a composite sectional view of the machine seen in Figs. 1A and 1B and are respectively taken substantially on lines IIA—IIA and IIB—IIB in Figs. 1A and 1B;

Fig. 3 is a side elevation of the right hand portion of the feeding means from outside the machine with certain portions broken away;

Fig. 4 is a section taken substantially on line IV—IV in Fig. 2B;

Figs. 5, 6, 7, 8, 9 and 10 are fragmentary views illustrating the progressive action of the feeding means;

Fig. 11 is a section taken on line XI—XI in Fig. 2A; and

Fig. 12 is a diagrammatic view of an electrical control circuit.

Figure 1A:
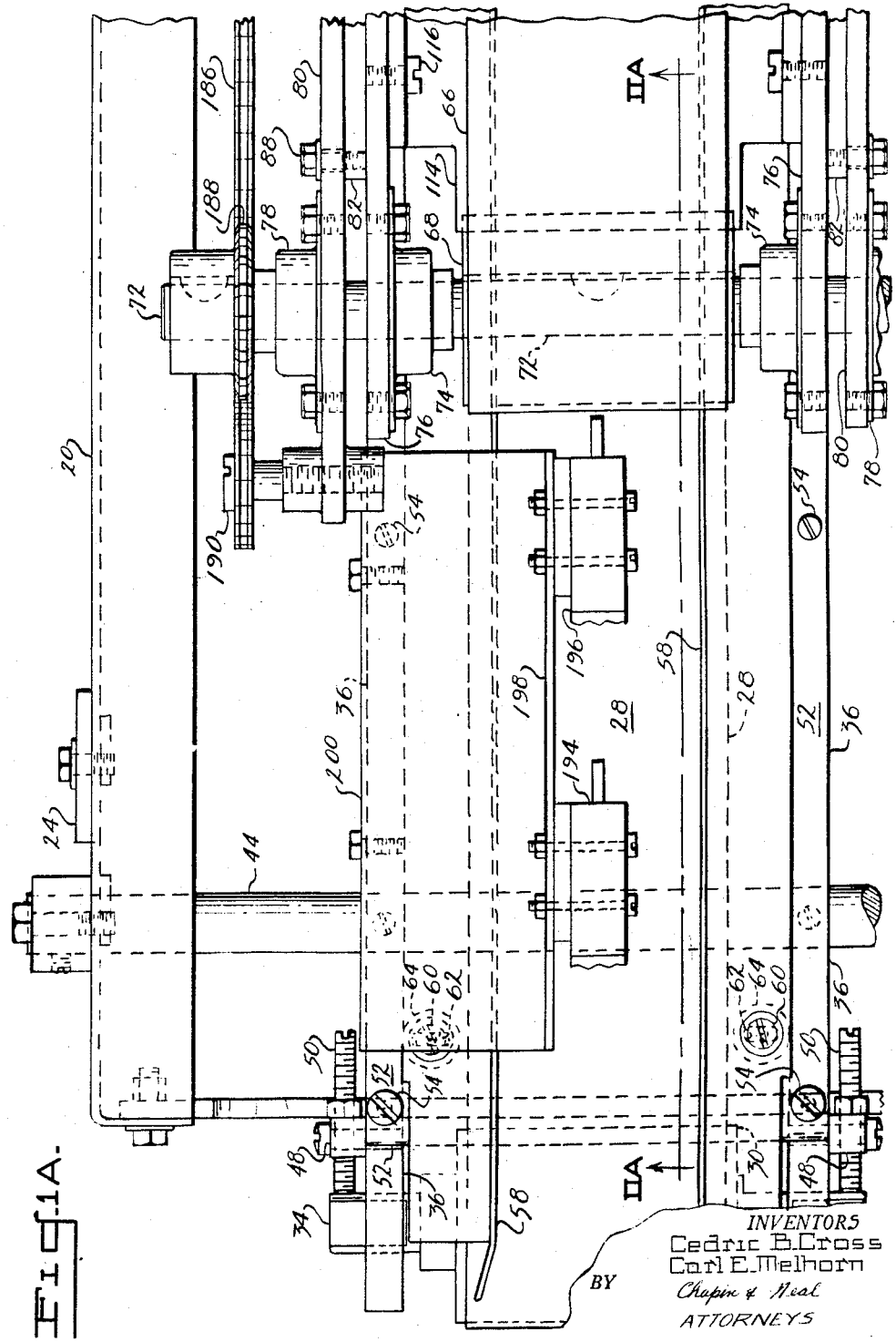

Referring first to Figs. 1A, 1B, 2A and 2B an elongated side frame channel 20, at one side of the machine, is found in each of the named figures. A corresponding side frame 22 is provided at the other side of the machine but is only illustrated in a fragmentary manner in Fig. 1B and in that figure is set inwardly of its true position. The side frame 22 is more fully shown in Fig. 3. The frame members may be appropriately supported as by legs 24 (Figs. 1A and 2A) and 26 (Figs. 1B and 2B).

An infeed conveyor comprising an endless belt 28 is trained over pulleys 30 (Fig. 1A) and 32 (Fig. 1B). The pulley 30 is rotatably mounted on a shaft 34 extending between and at one end of a pair of elongated bars 36. Pulley 32 is secured to a cross shaft 38 which is journaled by bearings 40 on either bar 36. One end of the shaft 38 is journaled on the side frame 20 at 42 and extends therebeyond to receive driving means later described. The bars 36 are supported by fixed shafts 44, 45 which extend between and are secured to the side frames 20, 22. The shaft 34 (Figs. 1A and 2A) is flatted at its ends to enter slots 46 at the ends of bars 36. Lugs 48 are provided on the bars 36 to receive screws 50 which may be tightened against the shaft 34 to obtain sufficient driving tension on the belt 28.

It will be noted that a plate 52 extends between the bars 36 to provide support for the upper run of belt 28. The plate 52 is secured to the bars 36 by screws 54 and spaced upwardly therefrom by elongated spacers 56 (Figs. 2A, 3 and 11). Side guides 58, generally in the shape of angle irons (Fig. 11) are disposed on either side of the path of travel of articles on the belt 28 and are secured to the plate 52 by screws 60 passing through adjusting slots 62 (Fig. 2A) in said side guides with spacers 64 raising the side guides above the level of the belt 28. (For clarity only one pair of screws 60 is illustrated although there are in fact other screws used to give sufficient rigidity to the side guides 58.)

In order to assist the feed of articles along the belt 28, a top belt 66 is trained around pulleys 68 (Figs. 2A and 3) and 70 (Figs. 2B and 3). Pulley 68 is keyed to a shaft 72 which is carried by bearings 74 on plates 76 (Fig. 1A). The shaft 72 is rotatably mounted by way of bearings 78 on outer plates 80 which are secured to fixed uprights 82 extending from the bars 36. The shaft 45 (Fig. 3) receives notched portions of the uprights 82 to partially support said uprights. Screws 86 otherwise support the uprights 82 by securing them to the bars 36. The plates 80 are adjustable on the uprights 82 to bring the pulley 68 and the infeed end of the belt 66 to a desired height above the belt 28. This end is accomplished by pivot screws 87 threaded into the uprights 82 and clamping screws 88 which pass through slots 90 in the plates 80 and which are also threaded into the uprights 82.

The pulley 70 is rotatably mounted on a shaft 92 which is flatted at its outer ends and received by slots 94 (Figs. 1B, 2B and 3) in the ends of plates 76. Lugs 96 extend inwardly from the plates 76 and threadably receive screws 98 which may be advanced against shaft 92 to provide proper tension for the belt 66.

Adjustment of the plates 80 and pulley 68 is facilitated by screws 100 (Figs. 2A and 3) which are threaded into bars 102 secured to and extending from the uprights 82. It will be noted that plates 76 and pulley 78 are free to swing about shaft 72. Downward movement of these elements and the outfeed end of belt 66 is limited by stop screws 104 (Figs. 2B and 3) which are threaded into bars 106 extending from the uprights 82. This assembly is maintained in its lower position, as limited by screws 104, by means of springs 108 extending between straps 110 (on upright 82) and pins 112 (on bars 76).

Preferably the adjustment of pulleys 68 and 70 is such that the belt 66 is spaced slightly above the articles as they enter between the belts 28 and 66. The pulley 70 is in a lower position in which the belt 66 bears against the articles to give substantial force to the feed of the articles. This feeding force of the belt 66 may be further augmented and controlled by a U-shaped backing plate 114 which is adjustably secured to the plates 76 by screws 116.

After the articles pass beyond the belts 28, 66 they pass onto a plate 118 and beneath a top guide 120 (Figs. 1B, 2B and 3). The plate 118 extends between the side frames 20, 22 and is secured thereto by screws 122, being appropriately spaced thereabove by spacers 124. The top plate 120 is secured by wing screw 126 to a bracket 128 extending from cross bar 130 which in turn is supported by posts 132 extending upwardly from either side frame 20, 22. (In Fig. 1B, the post 132 and frame 22 are seen but have been moved inwardly relative to the other parts.)

As the articles come to the end of plate 118 they engage a pair of feeding wheels 134 which cooperate in separating the articles from an abutting relation to a spaced apart relation in a manner which is later described in detail. The feeding wheels 134 are secured to a cross shaft 136 which is carried by bearings 138 (Figs. 1B and 4) secured to upper extensions of the legs 26. The upper ends of the legs 26 are interconnected by a cross brace 144 (Fig. 1B).

As articles advance beneath the feed wheels 134 they are preferably deflected downwardly by a fixed top guide 146 (Fig. 2B) and received on a platform 148 spaced therebeneath. Plates 149 (Figs. 1B and 4) rest on and are secured to the side frames 20, 22 and are each provided with an upwardly offset lip which engages the plate 118 to support the inner portions of the plates 149. The inner ends of the plates 149 are bent upwardly to provide side guides for the articles after they pass beyond the feeding wheels 134.

The platform 148 is part of conveyor means which comprise spaced transverse flights 150 for carrying articles away from the feeding wheels 134. The flights 150 are mounted, in a conventional manner, on roller chains 152 which pass around sprockets 154 and are driven by appropriate sprockets (not shown) on the machine with which the present feeding system is associated. Thus the flights 150 will move in timed relation with respect to the associated machine.

The sprockets 154 are keyed to a shaft 156 which is appropriately journaled on the side frames 20, 22. The shaft 156, being driven from the associated machine, serves as the power source for the remaining elements of the feed system. Sprocket 158 secured thereto, drives sprockets 160 and 162 through a roller chain 164 which also passes around an idler sprocket 166. Sprocket 160 is fast upon an appropriately journaled shaft 168 to which is secured a sprocket 170. The latter sprocket drives a sprocket 172, which is keyed to the feeding wheel shaft 136, through a chain 174. The feeding wheels 134 thus rotate in timed relation to the movement of the conveyor flights 150. The sprocket 162 is keyed to and rotates a cam shaft 176 in timed relation to both the feeding wheels 134 and conveyor flights 150.

A further sprocket 178 is keyed to shaft 156 and drives a sprocket 180 through a chain 182. The sprocket 180 is keyed to shaft 38 and thereby drives the lower belt 28. A second sprocket 184 is secured to the shaft 38 and drives the upper belt 66 through a chain 186 which drives a sprocket 188 (Fig. 2A, also 1A) keyed to shaft 72. The chain 176 passes around the sprocket 190 journaled on the rear plate 80 and also around a take-up sprocket 192.

During normal operation of the feeding device, there will be a steady flow of articles along the conveyor belt 28. In order to insure reliable operation of the present feeding system it is preferable that the line of articles extend back from the feeding wheels 134 at least past the upper belt 66. Detector means are therefore provided to sense the presence or absence of articles at the infeed side of the belt 66. These means comprise a pair of microswitches 194, 196 (Figs. 1A and 2A) which are secured to an offset upstanding flange 198 of a plate 200 which in turn is secured to the rear bar 36.

These detecting means are arranged to energize a solenoid 202 (Figs. 3 and 4) which raises the pulley 70 to bring the belt 66 out of feeding engagement with the articles on the belt 28. The solenoid 202 is mounted on a bracket 204, with its plunger 206 bifurcated to pivotally receive a link 208, which in turn is bifurcated to pivotally receive the outer end of a lever 210. The described assembly is maintained in its upper illustrated position by a tension spring 212 hooked onto the outmost end lever 210 and extending from the cross piece 144. An angle plate 211 (Figs. 3 and 4) is secured to the side plate 22 and overhangs the lever 210. A stop screw 213 threaded into the overhanging portion of plate 211 limits the upward movement of lever 210. The lever 210 is fast upon a shaft 214 which is journaled in lugs 216 extending from the cross bar 130. A lifting member 218 is secured to the inner end of shaft 214 with an integral tail 220 extending above the bar 130 (Fig. 2B). It will now be noted that plates 76 are provides with extensions 222 between which a bar 224 extends. Intermediate the bar 224, an extension 226 thereof overlies the tail 220 and a screw 228 is threaded into the extension 226 to provide adjustable means for engagement with the tail 220.

A stop member 230 is secured to the lifting member 218 and is provided with a cross bar 232 from which depend stops 234. The stop member and the lifting member are illustrated in their inoperative positions and their mode of operation will later be described in detail.

*Operation*

Under normal conditions a steady supply of articles is maintained on the conveyor belt 28, as by placing the belt 28 so that articles are fed directly thereto from a previous article treating machine. Thus a line of articles is fed along the belt 28, beneath the belt 66, and then over plate 118 to bring the leading article into engagement with the feeding wheels 134. It will be noted that the preferable practice is to provide a pair of wheels 134 (as shown) which engage the outer portions of articles, such as fiber boxes where their strength is greatest.

The action of the feeding wheels 134 is best understood from Figs. 5–10. In Fig. 5 an article $a$ is just approaching the feeding wheels 134 as a preceding article $b$ is being discharged thereby. In Fig. 6 it is indicated that article $a$ has been brought into engagement with the trailing faces of projections 236$a$ from the wheels 134. The rate of advance of the article $a$ and the succeeding articles in the line is thus controlled by the rate of the feeding wheels 134. Fig. 7 shows continued advance of the article $a$ and in Fig. 8 the leading end of said article begins to tip towards the conveyor platform 148 as its upper leading edge engages the beveled top guide 146. In Fig. 9 further tipping occurs and also in Fig. 10 wherein it will further be seen that article $a$ has completely passed beyond the platform 118 but is maintained against the projection 236$a$ by the feeding pressure on the line of articles. Reverting back to Fig. 5, article $b$ shows a further position which would shortly be assumed by article $a$ of Fig. 10. Article $b$ is urged into engagement with projection 236$b$ as projection 236$a$ engages its rear edge. Fig. 6 shows the manner in which projection 236$a$ separates article $b$ from the line of articles by forcing it downward and at the same time comes into the path of movement of said line of articles to control its advance by way of article $a$.

The conveyor flights 150 move at a much faster rate than that at which the articles are advanced by the feeding wheels 134. Thus the timed relations are such that almost immediately upon article $b$ being separated and deposited on the platform 148 the flight 150 (Fig. 7) will commence carrying it beyond the feeding wheels 134 before it can be crushed by the continually rotating projection 236a (Figs. 9 and 10).

The spacing between the projections 236a and 236b approximates the length of the article and may be longer or shorter than the article length so long as the spacing is sufficient to control article feeding and separation after the fashion just described.

The belts 28 and 66 forceably feed the line of articles against the feeding wheels and preferably are driven at a faster rate than the line is permitted to move by said feeding wheels. Thus some slippage occurs between the belts and the articles but the advance of the line is steady and at a substantially constant rate. This means that the mechanisms herein described are not subjected to the wear and tear of accelerating and decelerating the line of articles each time an article is separated. Further, practice of the invention through use of non-reciprocating parts, as disclosed, opens the door to rates of operation hitherto unobtainable.

When the line of articles is depleted so that there is no article under the switch 194 (Fig. 2A) that switch closes actuating the electrical circuit seen in Fig. 12 and resulting in energization of solenoid 202.

The switches 194, 196 are arranged in parallel and are normally maintained open by articles on the belt 28. A third manual switch 238 is electrically connected in parallel with the switches 194, 196 and may be physically mounted at any desired position on the machine. Closing of any one of the switches 194, 196 or 238 results in the solenoid 202 being energized in the following manner. Current flows from line $l$ of a source of alternating current to solenoid 202, through a line 240 to the coil 242 of a relay 244, then through lines 246, 248 and through one of the said parallel switches, then through lines 250, 252 to a set of timer points 254 which are momentarily closed by a cam 256. Upon closure of the timer points 254 the above described circuit is completed to the other side of the alternating current source through line $l'$ and the relay 244 will be energized. All of the relay contacts will close and the solenoid 202 will be energized through contacts 258 and line 259 leading to line $l'$. Timer points 254 being closed only momentarily, a hold in circuit for relay 244 is therefore provided, from line $l$ to line 250 (as described above) and then through relay contacts 260, and then back through relay contacts 262 to complete the circuit back to line $l'$.

When solenoid 202 is energized its plunger 206 is drawn down (Fig. 3), pulling lever 210 in the same direction and rotating shaft 214 in a clockwise direction. This rotative movement is timed (by the cam 256) to occur just after an article has passed beyond the end of the platform 118, as the article $a$ in Figs. 10 and 5. When so timed the stops 234 are moved by said rotation of shaft 214 freely downwardly (see dotted position in Fig. 2B) and present a barrier to the next succeeding article. At the same time the lifting member tail 220 swings upwardly, engaging the screw 228 and swinging the plates 76 and pulley 70 upwardly about shaft 72. The belt 66 is thus brought out of driving relation with the articles whenever the advance of the line of articles is thus stopped.

The solenoid 202 may be deenergized simply by releasing the switch 238 if the feed of articles had been caused by manual use of this switch. More often, however, the above reactions will result from the switches 194 and 196 closing to indicate a failure in the supply of articles. The use of two switches 194, 196 has been found of advantage in preventing depletion of the line of articles between the opposed runs of belts 28 and 66 and the feed wheels 134. In particular it has been found that, two articles may be separated from the line after the switch 194 is closed. Thus if switch 194 alone controlled the circuit random articles could cause the deleterious depletion mentioned above with the result that articles could become jammed at the feeding wheels 134 due to insufficient feeding pressure. Thus when a sufficient supply of articles, in abutting relation is provided on the conveyor belt 28, both switches 194, 196 (and switch 238) will be open as illustrated in Fig. 12. This opens the hold in circuit through line 250 for the relay 244. However, there is a second hold-in circuit for the relay 244 which comprises line 246, timer points 264 and relay contacts 262 which complete a circuit back to line $l'$. Thus the relay 244 will be deenergized at a definite time as controlled by a cam 266 which opens the timer points 264 and thus deenergizes relay 244 and solenoid 202 (when relay contacts 258 open).

The cam 266 is so arranged that solenoid 202 is deenergized at a time such that the lever 210 will rotate the shaft 214 and raise the stops 234 out of obstructive relation when the feeding wheel projections are in approximately the relative positions seen in Fig. 6. At the same time tail 220 permits the plates 76 to descend and the upper belt 66 brought into driving engagement with the line of articles.

The cams 256 and 266, which respectively control the timer for stopping and starting the line of articles, are secured to shaft 176 which is rotated by chain 164 and sprocket 162 in timed relation to the rotation of the feeding wheels 134. The timer points 254, 264 are of conventional construction and are shown only in diagrammatical form in Fig. 12. Cams 256 and 266 are also shown only in Fig. 12 where their function is fully apparent.

Having thus described the invention, what is novel and desired to be secured by Letters Patent of the United States is:

1. Means for urging a line of abutting articles along a given path at a given rate, means interposed in said path and controlling the rate of advance of the line of articles at a rate less than that at which they are urged, means defining said path and terminating adjacent said controlling means, a conveyor spaced outwardly from said controlling means a distance greater than the distance of the path defining means therefrom, said conveyor being arranged to receive articles from said line, said conveyor moving at a rate faster than the rate of advance of the line of articles and said controlling means having spaced projections movable towards and away from said line of articles with a component of motion away from the terminal portion of said path defining means and with the extreme movement of said projections toward said line occurring outwardly of said terminal portion to successively displace the leading article of said line of articles outwardly onto said conveyor and at the same time control the advance of the next article in the line thus controlling the rate of advance of the line as the displaced article is carried away by said conveyor.

2. Article feeding mechanism comprising a rotating feed wheel, means for urging a line of abutting articles into engagement with the lower peripheral portion of said wheel and in the same general direction in which said portion is moving, said urging means comprising means slippingly engaging the articles of said line and movable at a rate faster than that of the peripheral portion of said feed wheel, said urging means including means for supporting the line of articles spaced outwardly from the center of said wheel and terminating short of the point of engagement of said line of articles with said wheel, said wheel having peripherally spaced projections which provide rearwardly disposed faces for receiving the leading end of the leading article whereby one projection will control the advance of the line of articles, said projections being spaced that as the wheel rotates the next succeeding projection displaces the trailing edge of said leading article out of the path of advance of the line of articles and brings the rear face of said succeeding projection into controlling relation with respect to the next successive article, and conveyor means adjacent said article support and spaced outwardly of said wheel a distance greater than the terminal portion of said article supporting means to receive said displaced article, said conveyor means moving at a rate faster than the rate of advance of the line of articles whereby the displaced article will be carried therealong as the said one projection rotates away from said conveyor and successive articles will then be carried therealong in spaced apart relation upon continued rotation of said feed wheel.

3. Feeding means as in claim 2 wherein a second matched feeding wheel is provided and the two feeding wheels are spaced apart on a common shaft to engage the outer portions of the articles as they control their advance and displacement and conveyor is parallel to the article support.

4. Feeding means as in claim 3 wherein a deflecting plate is interposed between the two feeding wheels to guide the leading end of each article downwardly as it advances.

5. Feeding means as in claim 4 wherein the conveyor means comprise a horizontal platform spaced beneath the feeding wheel and spaced flights movable at said faster rate for carrying articles along said platform in spaced apart relation.

6. Feeding means as in claim 2 wherein the urging means comprise a lower conveyor belt and an upper conveyor belt spaced apart a distance enabling both belts to forceably drive the line of articles to the feeding wheel.

7. Feeding means as in claim 6 wherein one end of the upper conveyor belt passes around a roll spaced above the articles and then around a second roll disposed between the first roll and the feeding wheel, said second roll being pivotally mounted about the axis of said first roll to bring said upper belt into frictional engagement with said articles and further includes means for halting the advance of the line of articles and means operative upon actuation of said halting means for pivoting said second roll upwardly to bring the belt out of driving relation with the articles.

8. Feeding means as in claim 7 wherein the article halting means comprise stops immediately in advance of the feeding wheel and a single shaft is employed to actuate the stops and inactuate the said upper belt.

9. Feeding means as in claim 8 wherein said single shaft is actuated by a solenoid and said solenoid is actuated by sensing means at the infeed side of said upper belt for sensing the failure of a proper supply of articles.

10. Feeding means as in claim 9 wherein means having an operative connection with the feed wheels, are provided for timing the energization and deenergization of the solenoid in a desired timed relation to the movement of the feeding wheel.

11. Feeding means as in claim 2 wherein the conveyor means comprise a platform spaced beneath the feeding wheel and spaced flights movable beneath said article support and then over said platform at said faster rate for carrying articles along said platform in spaced apart relation and means are provided for establishing a predetermined timed relationship between the movement of said flights and the rotation of said feeding wheel projections.

References Cited in the file of this patent

UNITED STATES PATENTS

| | | |
|---|---|---|
| 1,209,801 | Beckett | Dec. 26, 1916 |
| 2,153,039 | Darling | Apr. 4, 1939 |
| 2,245,659 | Everett | June 17, 1941 |
| 2,479,822 | Enkur et al. | Aug. 23, 1949 |
| 2,756,862 | Creed | July 31, 1956 |